United States Patent [19]
Conrad

[11] 3,860,780
[45] Jan. 14, 1975

[54] METHOD OF MAKING SELF-CENTERING PULLEY USING MIG WELDING

[75] Inventor: Rene Conrad, San Meteo, Calif.

[73] Assignee: Dynaloc Corporation, San Mateo, Calif.

[22] Filed: Sept. 24, 1973

[21] Appl. No.: 400,426

[52] U.S. Cl.......................... 219/76, 29/121, 74/241, 219/128
[51] Int. Cl................................................ B23k 9/04
[58] Field of Search ....... 29/121 H; 74/241; 219/76, 219/128

[56] References Cited
UNITED STATES PATENTS

| | | | |
|---|---|---|---|
| 2,427,350 | 9/1947 | Carpenter et al. | 219/76 X |
| 2,660,429 | 11/1953 | Lorig | 74/241 X |
| 2,847,556 | 8/1958 | Brennen et al. | 219/128 UX |
| 2,946,087 | 7/1960 | Haroldson et al. | 29/121 H X |
| 3,487,489 | 1/1970 | Kuhns | 219/76 X |
| 3,571,557 | 3/1971 | Valentine | 219/76 X |
| 3,696,228 | 10/1972 | Thomas, Jr. et al. | 219/76 |

Primary Examiner—J. V. Truhe
Assistant Examiner—N. D. Herkamp
Attorney, Agent, or Firm—Schatzel & Hamrick

[57] ABSTRACT

A method and apparatus for depositing a stream of molten material upon the surface of a generally cylindrical pulley structure to form spirally tending ribbing thereon. The preferred apparatus includes a device for rotating the pulley, a MIG welding device, suitable mechanisms for moving the welding head along the axis of the pulley, and means for varying the feed rate of the welding wire to the welding head as the head is moved along the length of the pulley whereby the height of the ribbing above the pulley surface varies over the length of the pulley.

10 Claims, 4 Drawing Figures

PATENTED JAN 14 1975  3,860,780
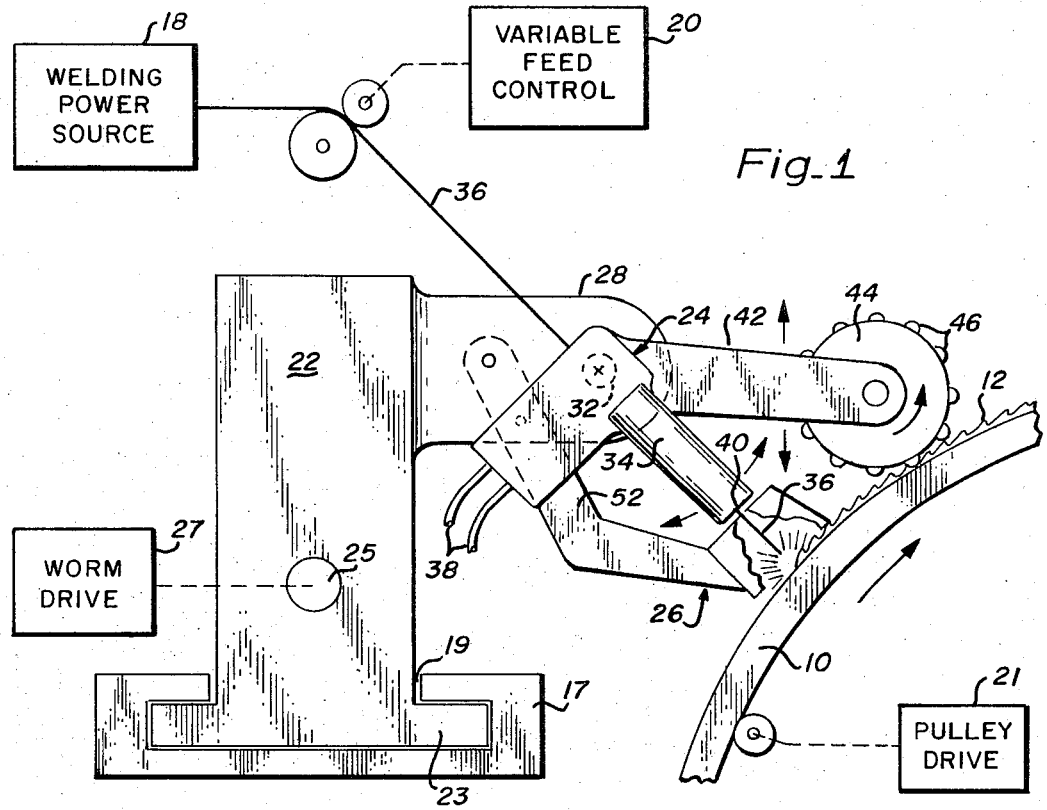
Fig. 1
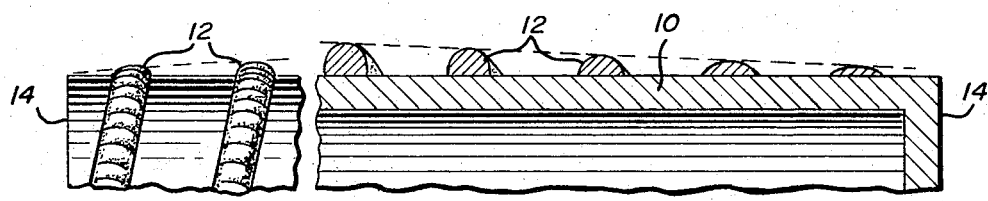
Fig. 2
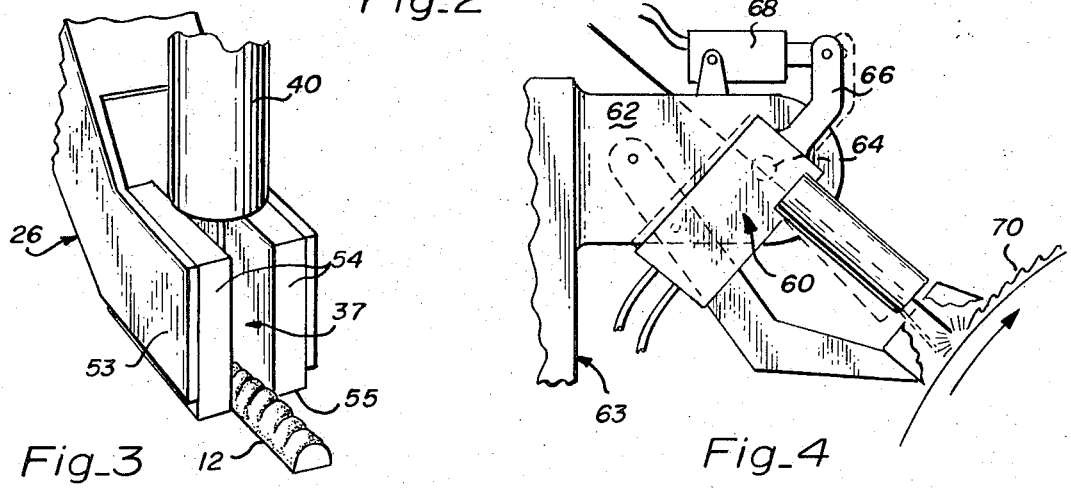
Fig. 3
Fig. 4

3,860,780

METHOD OF MAKING SELF-CENTERING PULLEY USING MIG WELDING

BACKGROUND OF THE INVENTION

1. Field of the Invention

The present invention relates to methods and apparatus for making self centering pulley devices and more particularly to a method and apparatus wherein certain welding devices and techniques are modified and used to make crowned pulleys having spirally tending ribbing.

2. Description of the Prior Art

Self centering pulleys having spirally tending ribbing have been known for some time, and in the past have been made using a number of techniques including those disclosed in the U.S. Pat. Nos. to Alvey 1,095,445; Griffith 1,568,401; Whitney 1,660,538; Lorig 2,622,448; and Conrad, et al, 3,713,438. As may be noted from these disclosures, typical methods of manufacturing include the use of cast moldings, spiral wrapping techniques and machining operations or a combination of these to effect a desired ribbed pulley configuration. Although such practices may result in the provision of pulleys which are quite suitable for the intended application, the methods of manufacturing suffer from the disadvantages of requiring several operative steps and usually require the use of expensive precision milling or molding equipment.

SUMMARY OF THE PRESENT INVENTION

It is therefore a primary objective of the present invention to provide a novel method and apparatus for making crowned centerline tracking pulleys which requires no molding, spiral wrapping or complex machining steps, yet provides pulley structures which are at least equivalent to the best prior art pulleys currently available.

In accordance with a presently preferred embodiment of the present invention, an arc welding means or the like is provided for applying spirally tending weld-beads of varying height to the surface of a cylindrical pulley to effect a ribbed crowning thereof. The height of the weld-bead above the pulley surface is controlled by a means which varies the wire feed rate as the ribbing is formed. The apparatus also includes means for causing the welding head to rock back and forth in the direction of the bead line so as to provide a full fillet while at the same time providing a non-smooth belt engaging surface of uniform waviness. The apparatus further includes a bead width control means for maintaining the bead-width uniform over the length of the roller.

Among the advantages of this invention over the prior art is that apparatus is provided whereby ribbed pulley structures suitable for both driven and idler applications may be fabricated in a much more expeditious and efficient manner than has heretofore been practiced in the prior art.

Other objects and advantages of the present invention will no doubt become apparent to those of ordinary skill in the art after having read the following detailed description of the preferred embodiments which are illustrated in the several figures of the drawing.

IN THE DRAWING

FIG. 1 is a schematic representation illustrating apparatus in accordance with the present invention for providing pulleys having spirally tending ribbing;

FIG. 2 is a partial longitudinal section illustrating the uniform width, varying height characteristic of the ribbing achieved using the apparatus illustrated in FIG. 1;

FIG. 3 is a partial perspective illustration of the bead-width control guide shown generally in FIG. 1;

FIG. 4 is a schematic illustration showing an alternative embodiment of apparatus in accordance with the present invention.

DETAILED DESCRIPTION OF THE PREFERRED EMBODIMENTS

In accordance with the method of the present invention, a smooth surfaced cylindrical pulley is rotated while a welding head is moved along the length of the pulley while issuing what might be described as a stream of molten metal for deposit upon the pulley surface to form a bead of metal providing a spirally tending surface rib. The rate at which the molten material is deposited upon the pulley surface is varied as the welding head moves relative to the pulley so that the bead height varies in a desired manner along the length of the pulley. The bead width is controlled so as to be uniform over the length of the pulley. Other variations of the generalized method described above will be discussed below with respect to particular apparatus used to implement the method.

Referring now to FIG. 1 of the drawing, a schematic representation is shown of a cylindrical pulley or roller device 10 having a spirally tending rib 12 being applied thereto in accordance with the present invention. As will be further described below with reference to FIGS. 2 and 3, the ribbing 12 is of uniform width, i.e., in the axial direction of pulley 10, but is of varying height above the surface 14 over the length of pulley 10. More particularly, the height of the ribbing 12 above the cylindrical surface 14 increases as it spirals toward the center of the pulley so as to in effect, provide a crowned pulley device.

In accordance with the illustrated embodiment of the present invention, the ribbing 12 is formed on surface 14 by a Metal Ion Gas welding apparatus which is modified and adapted so as to be capable of laying a bead on a cylindrical surface in such a manner that the bead height varies uniformly over a given length of the pulley. The apparatus includes a welding head and carriage mechanism, an electrical power source 18, a variable welding wire feed control mechanism 20, and a pulley drive and support mechanism 21.

Carriage mechanism includes a base 17, a tool post 22, a welding head unit 24, and a weld bead width control guide 26. Base 17 provides a channel 19 which is aligned in parallel with and extends along side the pulley 10. The lower flange 23 of tool post 22 mates with and is slideably driven along channel 19 by a worm 25 which is rotated by a suitable worm drive mechanism 27. The worm drive 27 is preferably synchronized with the drive 21 for rotating pulley 10. Post 22 has an arm 28 which extends laterally relative thereto and toward the axis of pulley 10. Arm 28 serves as a support for the welding head unit 24 which is pivotally supported at 32 and includes a tubular extension 34 which provides a passage for guiding the welding wire 36 into an arcing position above surface 14. Tube 34 also conducts inert gases which are introduced thereto through the tubes 38 for discharge at the weld situs 37 an exit orifice 40 in tube 34.

Unit 24 also includes a rocker arm 42 which is affixed to and projects obliquely relative to tube 40 and carries a toothed rocker wheel or other suitable camming means 44 at its distal extremity. As rocker wheel 44 rolls over the surface 14 of pulley 10, the tooth-like projections 46 cause rocker arm 42, and thus welding head 24, to rotate back and forth through a small angle about the pivot point 32 and in turn cause tube 34 and welding wire 36 to oscillate relative to the surface 14. This oscillatory motion in the general direction of the bead line causes a full fillet to be produced along the bead line and at the same time gives a wavy texture to the surface of the bead 12.

The height of the bead 12 relative to surface 14 is controlled by a variable speed control unit 20 which varies the feed rate of wire 36 to head 24 as the weld is being made. The faster the wire 36 is driven into the weld situs, the larger the quantity of material deposited to form the bead 12 and vice versa. Welding current is provided to wire 36 by a standard welding power unit as indicated by the block 18.

In order to facilitate the height build-up of the bead 12, i.e., prevent the molten metal from spreading outwardly as it is deposited upon surface 14, the bead width control guide 26 is provided. Guide 26 includes an arm 52 which is affixed to post projection 28. As illustrated more clearly in FIG. 3 of the drawing, guide 26 and terminates in a bifurcated bracket 53 for carrying a pair of ceramic plates 54. The plates 54 are disposed in parallel relationship to each other and are spaced apart by the desired width of the weld bead 12. The bottom edge surfaces 55 are adapted to ride directly upon the pulley surface 14 and have a length in the bead line direction sufficient to accomodate the sweeping motion of the weld-wire 36 as it oscillates within the gap 37.

In operation, a cylindrical pulley 10 is mounted upon a drive mandril (not shown) and the welding head is positioned at the middle of pulley 10. The pulley rotation speed and weldhead travel speed are then selected so as to provide the desired ribbing pitch, and variable wire feed control 20 is set to feed the wire 36 to weld head 24 at a decreasing rate which initially causes enough metal to be deposited to give the maximum desired weld-bead height as pulley 10 turns therebeneath. In other words, the wire feed velocity decreases at a controlled rate so that the bead height diminishes from a high value at the center of the pulley to a low value at the end of the pulley. As the bead is formed, the guide 26 constrains the width thereof allowing the molten metal to set at the desired bead height without spreading beyond the selected width. In addition to providing for uniform width of the weld-bead 12, the ceramic surfaces of weld guide 26 also prevent to some degree the occurence of weld spatter on other portions of the pulley surface 14.

Once one-half of the pulley is provided with the bead ribbing, the welding head is returned to the center of the pulley and caused to move toward the other end as the pulley is rotated with the wire feed operating at the same varying rate as alluded to above so as to develop a corresponding bead of decreasing height as the welding head 24 moves from the center of the pulley to the opposite end thereof. Once head 24 has traversed to the opposite pulley end, the pulley is complete and ready for use or for further processing for specialized applications, i.e., for certain applications the pulley might be coated with teflon or the like.

Unlike the prior art methods, it will be noted that no machining, molding or fastening steps are required to provide the spirally tending ribbing on the pulley surface. Furthermore, due to the oscillatory motion of the weld-head, a texture is provided in the bead surface, as illustrated in FIG. 3, which assists in the engaging relationship between the pulley and a belt driven or carried thereby.

Turning now to FIG. 4 of the drawing, an alternative embodiment of the present invention is shown which includes a welding head 60 which is likewise fastened to a laterally projecting arm 62 of a lathe post 63 by means of a suitable pivot means 64. However, instead of being provided with a rocker wheel, as in the previous embodiment, for rolling upon the pulley surface 70, the rocker arm 66 is modified and coupled to a suitable electromechanical drive means 68 which is affixed to a arm 62. When energized by a reciprocating electrical current, drive means 68 alternatingly drives rocker arm 66 to and fro thereby serving a purpose similar to that of the sprocket wheel shown in FIG. 1, namely, to cause welding head 60 to oscillate back and forth at a controlled rate. respectively Operation of this embodiment is practically identical to that of the previously described embodiment except that it has the advantage that the oscillatory rate of welding head 60 can be electrically selected and controlled whereas in the previous embodiment, in order to change the oscillatory frequency, a mechanical substitution of rocker wheels would be required. It will also be appreciated that in the electrical embodiment, higher oscillatory rates can be achieved than in the mechanical embodiment, if desired.

Although but two embodiments of the present invention have been illustrated in somewhat schematic, though operatively descriptive form, it will be appreciated that many alternative embodiments of the actual structure and method used could be selected. For example, instead of forming the welded ribbing by moving the head 24 from the center outwardly towards each end, the head could be caused to sweep from one end of the pulley to the other with the wire feed rate being increased during the traverse of the first half of the pulley length, temporarily interrupted at the midpoint and then decreased during the traverse of the second half length. Similarly, the various controls could be programmed relative to each other in any of many combinations so as to achieve other similar desired results.

As a still further alternative embodiment, the described or similar apparatus could be used to develop spirally tending ribbing of uniform height above the surface of a crowned pulley in order to provide a crowned, ribbed pulley. Moreover, two or more welding heads might be operated together simultaneously, either in fixed parallel relationship or in a converging or diverging relationship, i.e., one on each side of the pulley center. It is also contemplated that other types of welding devices besides Metal Ion Gas welding may be utilized to deposit a stream or bead of molten metal or other material onto the pulley surface between the guide plates 54. For example, similar means for depositing a fast-setting thermoplastic, a stream of molten glass or a quick setting resin might be used to make pul-

What is claimed is:

1. Apparatus for making self-centering pulleys of the type which include a generally cylindrical body having spirally tending ribbing on the outer surface thereof, comprising:
   first means for supporting said body and causing it to revolve about its longitudinal axis;
   second means for continuously depositing quick-setting molten material upon the outer surface of said body;
   third means for moving said second means relative to said first means for depositing said material in a bead upon said surface to form the spirally tending ribbing; and
   control means for varying the quantity of said material deposited upon said surface so as to effectively provide a taper to said deposited material.

2. Apparatus as recited in claim 1 wherein said second means includes an arc welding means having a head unit disposed proximate said surface and means for causing said head unit to oscillate in a direction generally transverse to its direction of movement parallel to said axis so as to effectively provide a full fillet regardless of the amount of said material being deposited and to provide a wavy texture to said bead.

3. Apparatus as recited in claim 2 wherein said means for causing said head unit to oscillate the a caming means for includes engaging said surface and a rocker arm coupling said caming means to said head unit whereby said head unit is caused to rotate in said oscillatory fashion about a pivot point as said caming means rollingly engages said surface.

4. Apparatus as recited in claim 3 wherein said welding means further includes a weld guide carried adjacent said surface and including two spaced apart parallel wall members disposed to lie along the sides of the oscillatory path followed by said head unit, said weld guide being operative to control the width of the weld-bead formed on said surface by said head unit.

5. Apparatus as recited in claim 4 wherein said wall members include ceramic plates having lower edges for engaging said surface, and fore and aft side edges extending beyond the limits of the oscillatory path followed by said head unit.

6. Apparatus as recited in claim 5 wherein said control means further includes means for varying the rate at which welding material is fed to said head unit whereby the height to which said weld bead extends above said surface at one point along the length of said pulley differs from the height of that formed at a second point along said length.

7. Apparatus as recited in claim 2 wherein said means for causing said head unit to oscillate includes an electromechanical actuator means and a rocker arm for coupling said actuator means to said head unit whereby said head unit is caused to rotate in oscillatory fashion about a pivot point when alternating electrical energy is supplied to said actuator means.

8. A method of making self-centering pulleys of the type which include a generally cylindrical body having spirally tending ribbing on the outer surface thereof, comprising the steps of:
   rotating said body about its longitudinal axis;
   moving a source of quick setting molten material parallel to the longitudinal axis of said body;
   continuously depositing a stream of quick setting molten material from said source onto said surface of said body; and
   varying the flow rate of said molten material as said source is moved along said path whereby spirally tending ribbing of uniformly varying height above said surface is formed over the length of said body.

9. A method of making pulleys as recited in claim 8 wherein the step of varying said flow rate is accomplished by varying at a controlled rate the amount of welding material supplied to a welding head within said source.

10. A method of making pulleys as recited in claim 9 and further including the step of oscillating said welding head back and forth in a direction generally normal to its directions of movement relative to said axis for providing a full fillet regardless of the amount of said material being deposited by said source and for producing a wavy texture to the surface of said bead.

* * * * *

UNITED STATES PATENT OFFICE
CERTIFICATE OF CORRECTION

Patent No. 3,860,780          Dated   January 14, 1975

Inventor(s)  Rene A. Conrad

It is certified that error appears in the above-identified patent and that said Letters Patent are hereby corrected as shown below:

Column 3, line 30, after "26" delete the word --and--;

Column 4, line 21, delete "a" first occurrence;

Column 4, line 26, delete "respectively";

Column 5, line 38, change "the" to --includes--; and

Column 5, line 39, change "includes" to --rollingly--.

Signed and sealed this 11th day of March 1975.

(SEAL)
Attest:

RUTH C. MASON
Attesting Officer

C. MARSHALL DANN
Commissioner of Patents
and Trademarks